United States Patent
Manwaring et al.

(10) Patent No.: US 6,749,222 B2
(45) Date of Patent: Jun. 15, 2004

(54) RESPONSIVE ENERGY ABSORBING DEVICE FOR STEERING COLUMNS

(75) Inventors: Marvin V. Manwaring, Clio, MI (US); Melvin Lee Tinnin, Clio, MI (US); Ravindra Jwalapathy, Saginaw, MI (US); Ray Garnet Armstrong, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/268,330

(22) Filed: Oct. 10, 2002

(65) Prior Publication Data

US 2003/0075405 A1 Apr. 24, 2003

Related U.S. Application Data

(60) Provisional application No. 60/342,930, filed on Oct. 19, 2001.

(51) Int. Cl.[7] .................................................. B60R 1/19
(52) U.S. Cl. ........................................ 280/777; 74/493
(58) Field of Search .......................... 280/777; 74/492, 74/493; B60R 1/19

(56) References Cited

U.S. PATENT DOCUMENTS

| | | | | |
|---|---|---|---|---|
| 5,286,056 A | * | 2/1994 | Speich | 280/777 |
| 5,720,496 A | * | 2/1998 | Riefe et al. | 280/775 |
| 5,803,496 A | * | 9/1998 | Cymbal | 280/777 |
| 6,189,929 B1 | * | 2/2001 | Struble et al. | 280/777 |
| 6,234,528 B1 | * | 5/2001 | Ben-Rhouma et al. | 280/777 |
| 6,322,103 B1 | * | 11/2001 | Li et al. | 280/777 |
| 6,367,840 B1 | * | 4/2002 | Duval et al. | 280/777 |
| 6,478,333 B1 | * | 11/2002 | Barton et al. | 280/777 |
| 6,578,872 B2 | * | 6/2003 | Duval et al. | 280/777 |
| 2002/0024210 A1 | * | 2/2002 | Nomura et al. | 280/777 |

* cited by examiner

*Primary Examiner*—Ruth Ilan
(74) *Attorney, Agent, or Firm*—Michael D. Smith

(57) ABSTRACT

An energy absorbing device for a collapsible steering column has a plurality of plastically deformable straps each with one end connected to the steering column and an opposite end bent around an anvil connected to stationary vehicle support structure. When the steering column collapses, the straps unwind from the anvils, thereby resisting steering column collapse and absorbing energy. One or more of the straps may be cut in two by a knife at the time of the collision, thereby removing it from the energy absorbing system. In another form of the invention, an energy absorbing strap extends around a piston which has two or more different size anvils. The piston is axially movable in a cylinder to positions surrounding one or another of the anvils. The strap is drawn over the anvil it surrounds when the steering column collapses, thereby resisting collapse of the steering column and absorbing a certain amount of energy depending on the size of the anvil.

3 Claims, 10 Drawing Sheets

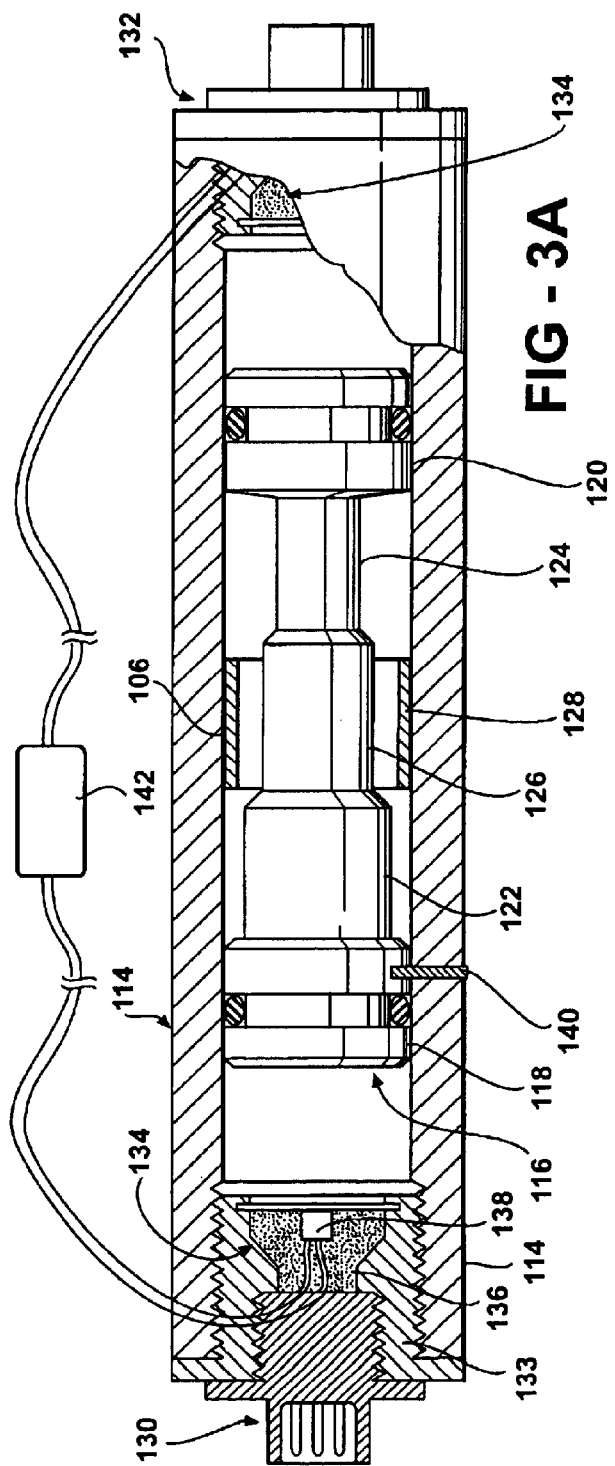
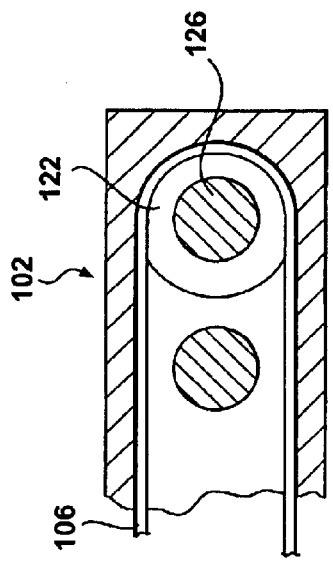
FIG - 3A
FIG - 3B

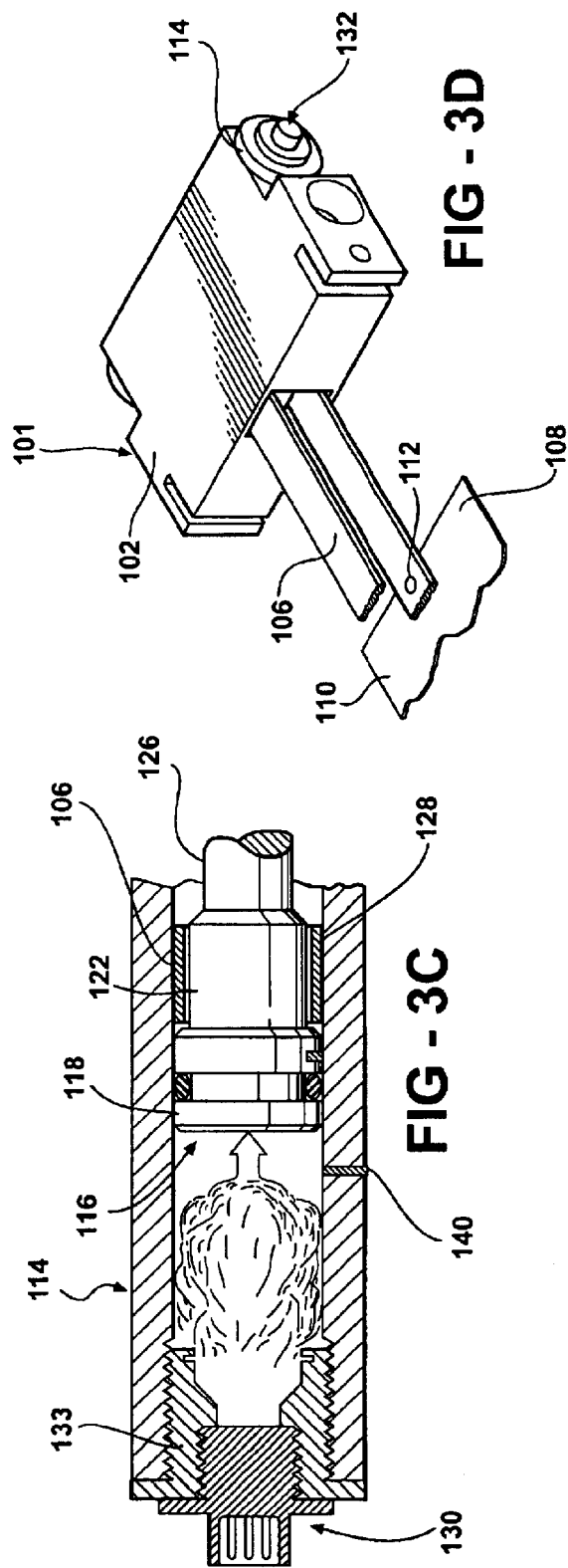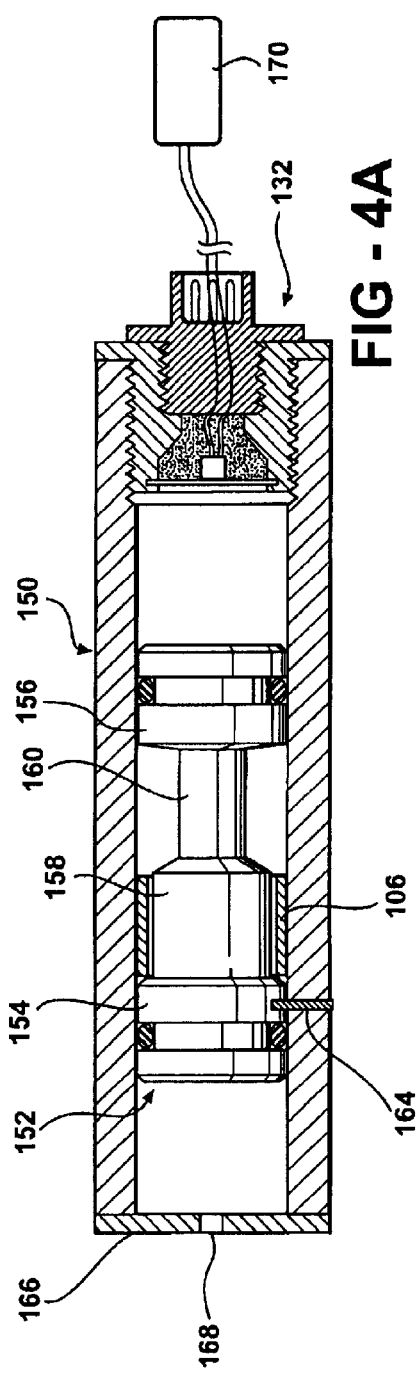

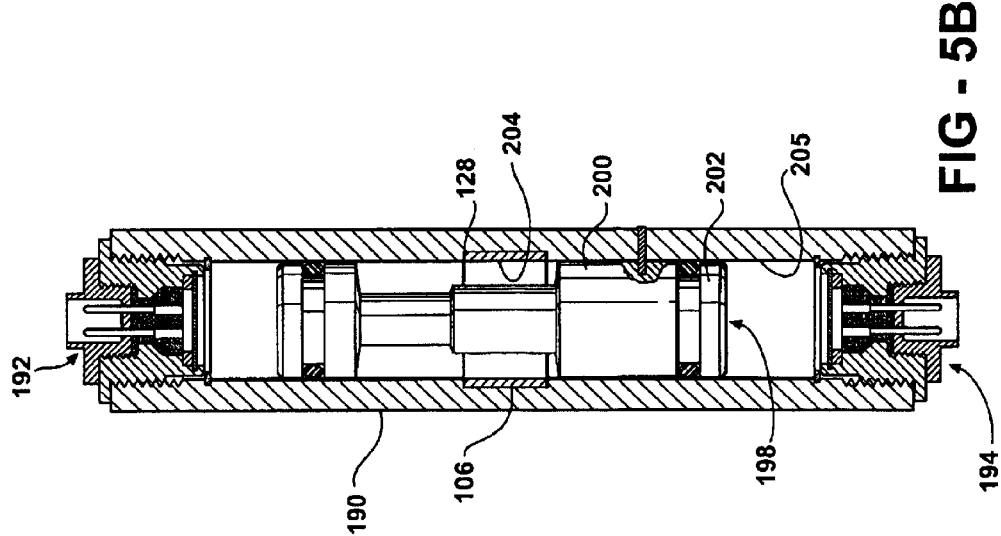
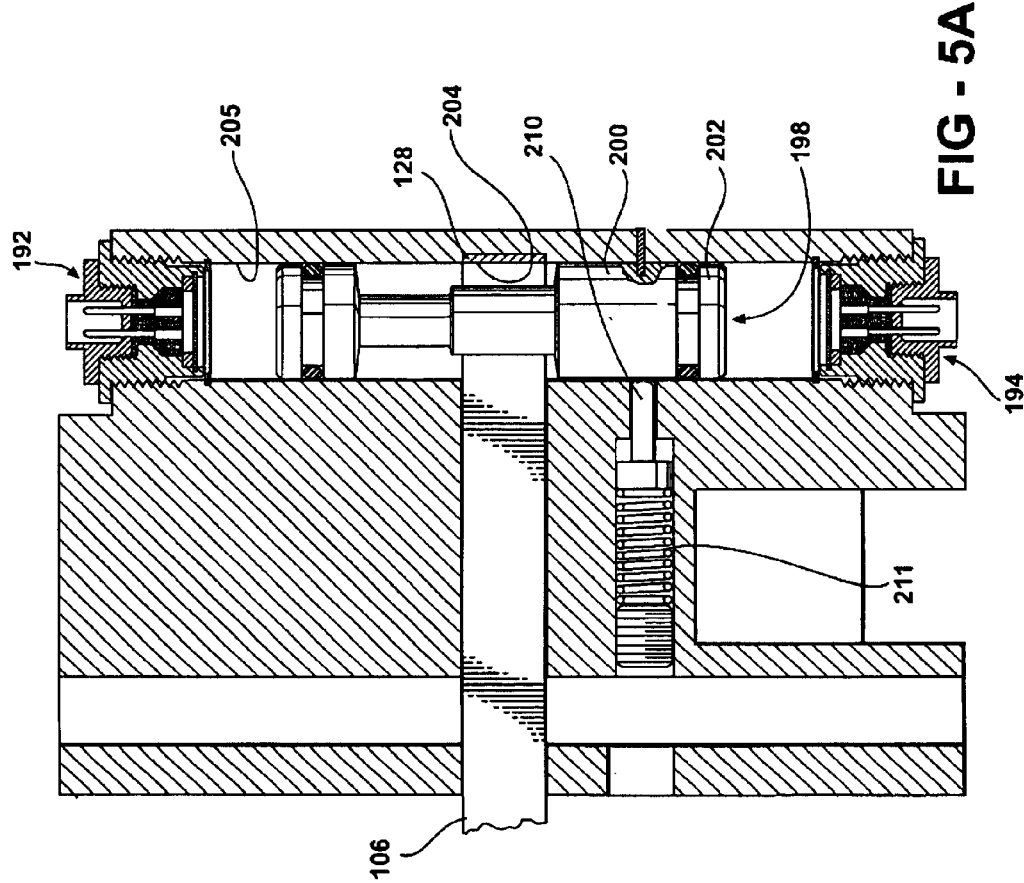
FIG - 5B
FIG - 5A

RESPONSIVE ENERGY ABSORBING DEVICE FOR STEERING COLUMNS

REFERENCE TO RELATED APPLICATION

This application claims the benefit of U.S. Provisional Application No. 60/342,930, filed Oct. 19, 2001.

TECHNICAL FIELD

This application relates generally to steering columns and more particularly to a responsive energy absorbing device for steering columns.

BACKGROUND OF THE INVENTION

Many steering column assemblies today are equipped with kinetic energy absorption devices to reduce the likelihood of injury in case of an accident. Such devices come in many different forms. One form that is particularly effective in absorbing significant quantities of energy in a relatively small amount of space employs a plastically deformable member such as a metal strap which is bent over an anvil. In the event of a head-on collision, the deformable strap is drawn across the anvil and the deformed shape travels along the length of the strap, causing a reaction force resisting collapse of the steering column and absorbing energy.

Typically, energy absorbing devices, such as those employing a plastically deformable strap, are designed to protect drivers of average weight in a collision of average severity, without taking into account the fact that all drivers are not of average weight and that collisions vary considerably in severity depending on vehicle speed at the time of the impact.

SUMMARY OF THE INVENTION

In accordance with the present invention, it is possible to vary the reaction force resisting collapse of the steering column. For example, the energy absorbing device of this invention may provide a smaller amount of resistance in the case of a less severe collision or a lower weight driver, or a greater amount of resistance in the case of a more severe collision or a driver of greater weight. Whether the driver is seated close to the steering wheel, or belted, are also factors to be considered in determining the desired amount of reaction force.

The resistance is preferably provided by a plastically deformable strap having one end portion bent around an anvil. The anvil is connected to the steering column and the other end portion of the strap is connected to stationary vehicle support structure, or vice versa. This arrangement forms a linkage between the steering column and the vehicle support structure so that when the steering column collapses in a collision, the strap will move over the anvil and resist such collapse. Often two or more such straps similarly arranged are provided. By breaking one or more of such linkages, the associated strap will drop out of the system so that the overall resistance to collapse is reduced depending upon conditions detected by a controller either before or at the instant of the collision.

In one form of the invention, the linkage is broken by a knife operable to bisect the associated strap. Preferably, the knife is actuated by an explosive charge which is ignited by a signal generated by the controller. In another form of the invention, the linkage is broken by an explosive charge which severs one of the connections. The explosive charge in this form of the invention is also ignited by the signal from the controller. One such connection may include a reduced neck portion of the anvil and the explosive charge may be disposed in a hollow interior of the anvil adjacent to the neck portion.

In yet another form of the invention, an energy absorbing strap extends around a piston which has two or more different size anvils. The piston is axially slidable in a cylinder to positions surrounding one or another of the anvils. The strap is drawn over the anvil it surrounds when the steering column collapses, thereby resisting collapse of the steering column and absorbing a certain amount of energy depending on the size of the anvil.

One object of this invention is to provide an energy absorbing device having the foregoing features and capabilities.

Other objects, features and advantages of the invention will become more apparent as the following description precedes.

BRIEF DESCRIPTION OF THE DRAWINGS

The present invention will now be described, by way of example, with reference to the accompanying drawings, in which:

FIG. 3A is a sectional view of a portion of the energy absorbing device in FIG. 3D;

FIG. 3B is a fragmentary sectional view of another portion of the energy absorbing device of FIG. 3D;

FIG. 3C is a fragmentary sectional view of a portion of FIG. 3A after the ignition of an explosive charge and collapse of the steering column;

FIG. 3D is a perspective view of another embodiment of the energy absorbing device;

FIG. 4A is a sectional view of a portion of an energy absorbing device similar to the device of FIG. 3A but of modified construction;

FIG. 5A is a sectional view of an energy absorbing device similar to the device of FIG. 4A but operated by an explosive charge at each end;

FIG. 5B is a fragmentary sectional view of the device of FIG. 5A from a different angle;

DETAILED DESCRIPTION OF THE PREFERRED EMBODIMENTS

Figure 1A:
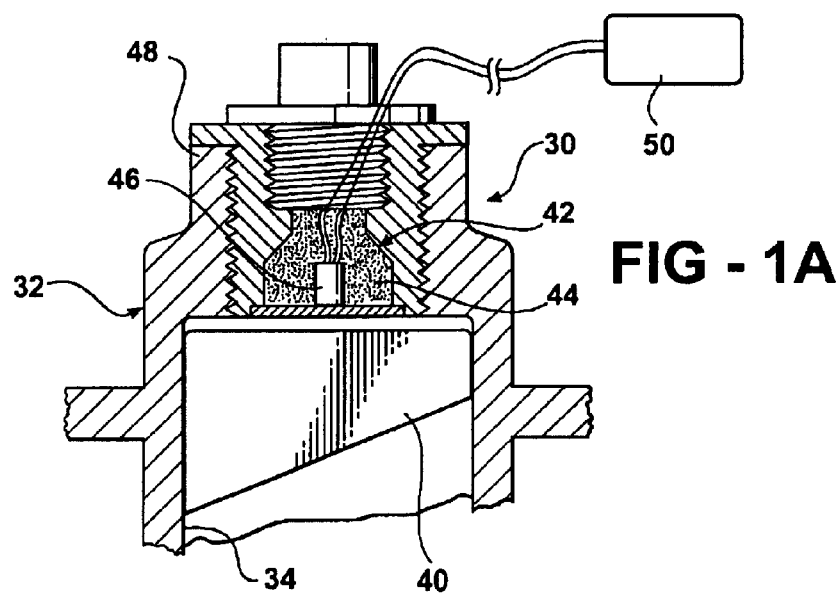
FIG. 1A is a fragmentary sectional view of a portion of an energy absorbing device shown in FIG. 1B, constructed in accordance with the invention.
Figure 1B:
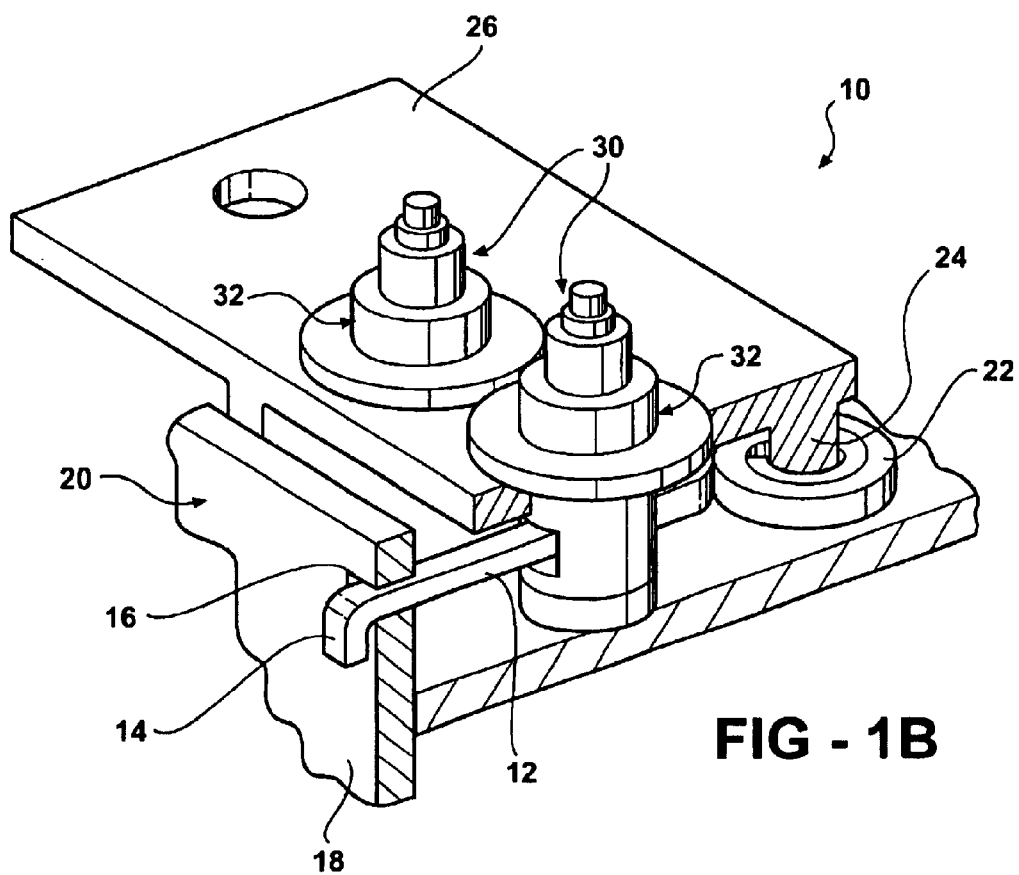
FIG. 1B is a fragmentary perspective view, with parts in section, showing the energy absorbing device of which a portion is shown in FIG. 1A.

Referring now more particularly to the drawings and especially to FIGS. 1A–1C and 1E, an energy absorbing device 10 is shown which includes a plurality of elongated, parallel, spaced apart, plastically deformable metal straps 12. Each strap 12 has a bent end portion 14 extending through a hole 16 in a jacket portion 18 of a collapsible steering column 20 forming a connection 21 of the strap to the steering column. Each strap has a spiral end portion 22 which is wound around an anvil 24. The anvils 24 are secured to or integral with stationary vehicle support structure 26 forming a connection 27 of the strap 12 to the vehicle support structure. The connections 21 and 27, the anvils 24, and the straps 12 provide a linkage 29 between the steering column 20 and the vehicle support structure 26, so that when the steering column collapses, the straps will move with the steering column.

An actuator assembly 30 for each strap is mounted on the vehicle support structure 26. The actuator assembly 30 has a body 32 formed with a cylinder 34 which has an open inner end. A cap 36 is threaded on the body 32 to close the open end of the cylinder 34. A mid-portion of each strap extends through the body 32 of the associated actuator assembly 30 and through the cylinder 34.

A knife 40 in each cylinder 34 is normally poised over one of the straps 12. Behind the knife is an actuator 42 comprising an explosive charge 44. An igniter 46 contained in a cap 48 closes the outer end of the cylinder.

In the event of a head-on collision, the driver is often thrown forward against the steering column 20, with a force sufficient to cause the steering column to collapse. The purpose of the straps 12 is to resist the collapse of the steering column and thereby absorb energy and prevent serious injury to the driver. The straps resist collapse of the steering column by unwinding as they are pulled from the anvils. A controller 50 is provided, having sensors for detecting certain conditions existing at the time of impact, such as the severity of the collision, the weight of the driver, the driver's seat position, and whether or not the driver is belted. If the driver is of less than average weight or the collision is of only moderate severity, less resistance to steering column collapse may be needed and it may therefore be desirable to remove the effect of one or more of the straps 12 of the energy absorbing device 10. This will be accomplished by a signal from the controller 50 to the igniter 46 for at least one of the actuators 42, causing the igniter to activate the explosive charge 44 of that actuator to advance the knife 40 and bisect or cut one of the straps in two. The signal may go to the actuator 42 of one strap 12 or more than one strap as determined by the sensors in the controller 50, or no signal may be sent to the actuators in the case of a very severe collision and a driver of greater than average weight. Under those circumstances it might be desirable to have all of the straps 12 involved in the absorption of energy.

Figure 1C:
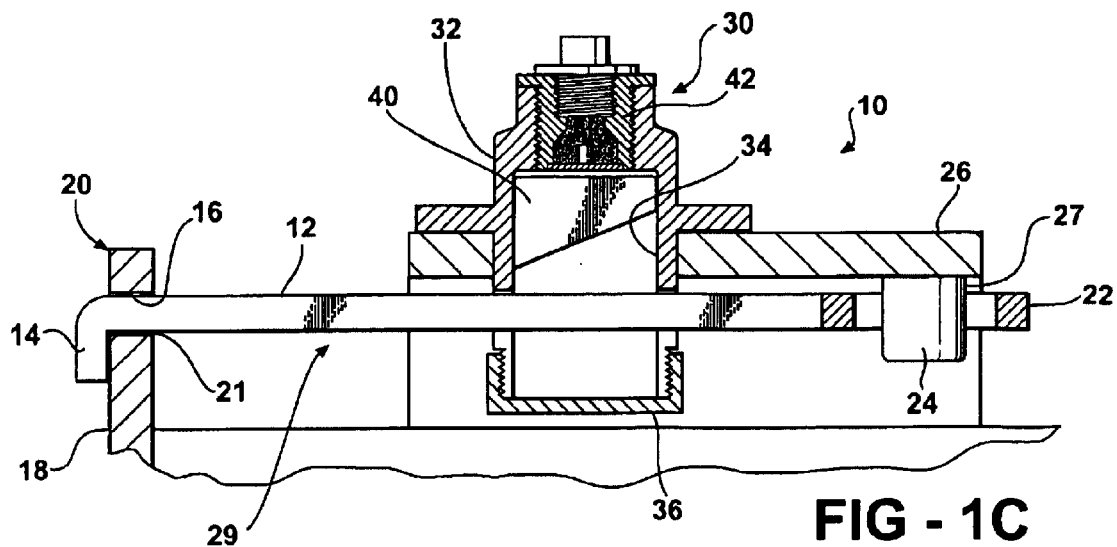
FIG. 1C is a sectional view of the energy absorbing device of FIG. 1B.
Figure 1D:
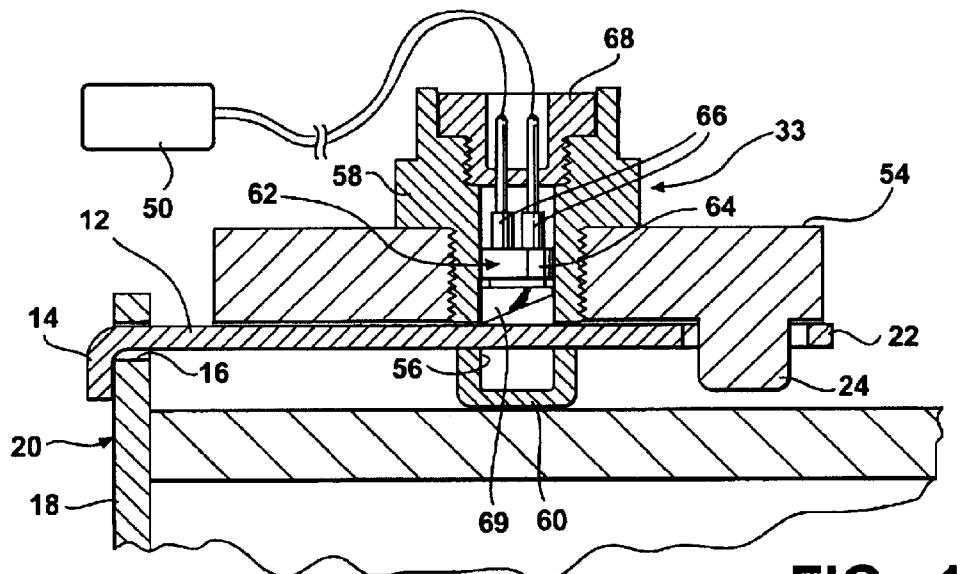
FIG. 1D is a sectional view of a modification of the energy absorbing device of FIG. 1B.
Figure 1E:
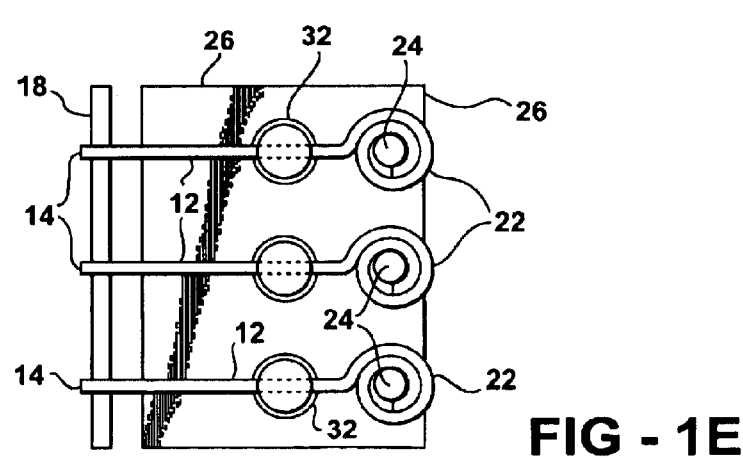
FIG. 1E is a bottom plan view of a portion of the energy absorbing device of FIG. 1B showing three plastically deformable straps.

FIG. 1D shows a slightly modified form of actuator assembly 53. The actuator assembly 53 is mounted on a vehicle support structure 54. The end of the cylinder 56 in the body 58 of the actuator assembly 53 is closed by an integral end portion 60 of the body. An actuator 62 includes an explosive charge 64 in the cylinder 56 which is adapted to be actuated by igniters 66 carried by a cap 68 threaded into the body 58. The knife 69 is advanced by the explosive charge 64 in the same manner as previously described in connection with FIGS. 1A–1C. Otherwise the structure of FIG. 1D is essentially the same as the structure in FIG. 1C and corresponding parts have the same reference numerals.

In both FIGS. 1C and 1D, the igniters are preferably pyrotechnic devices which are very fast acting, capable of setting off the explosive charge in only milliseconds after the collision and the reception of a signal from the controller.

Referring now to FIGS. 2A–2D, an energy absorbing device 71 includes a plurality of elongated, parallel, spaced apart, plastically deformable metal straps 72. Each strap 72 has a bent end portion 74 extending through a hole 76 in a jacket portion 78 of a steering column 80. Each strap has a U-shaped intermediate portion 82 bent around an anvil 84. Each anvil 84 is formed as an integral part of a body 86 of an actuator assembly 88. The bodies 86 are secured in openings of stationary vehicle support structure 90.

The body 86 of each actuator assembly 88 is integrally connected to an associated anvil 84 by a reduced neck portion 94 of the anvil. The body 86 of each actuator assembly 88 is hollow to receive an actuator 95 comprising an explosive charge 96. The charge 96 extends across the neck portion 94 and into a hollow interior of the anvil. Igniters 98 for the explosive charge 96 are carried by a cap 99 threaded into the body 86.

Figure 2A:
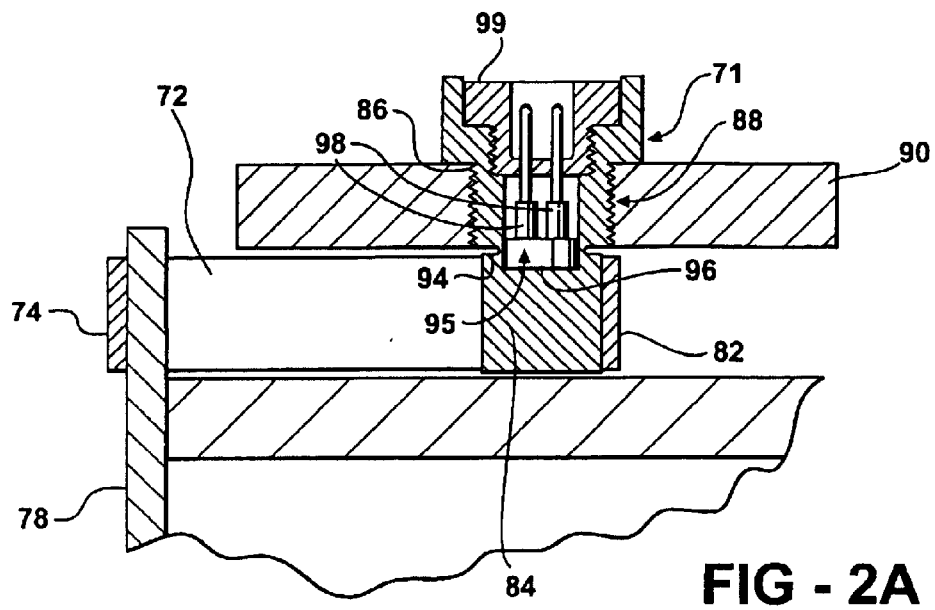
FIG. 2A is a fragmentary sectional view similar to FIGS. 1C and 1D, but showing another embodiment of the energy absorbing device.
Figure 2B:
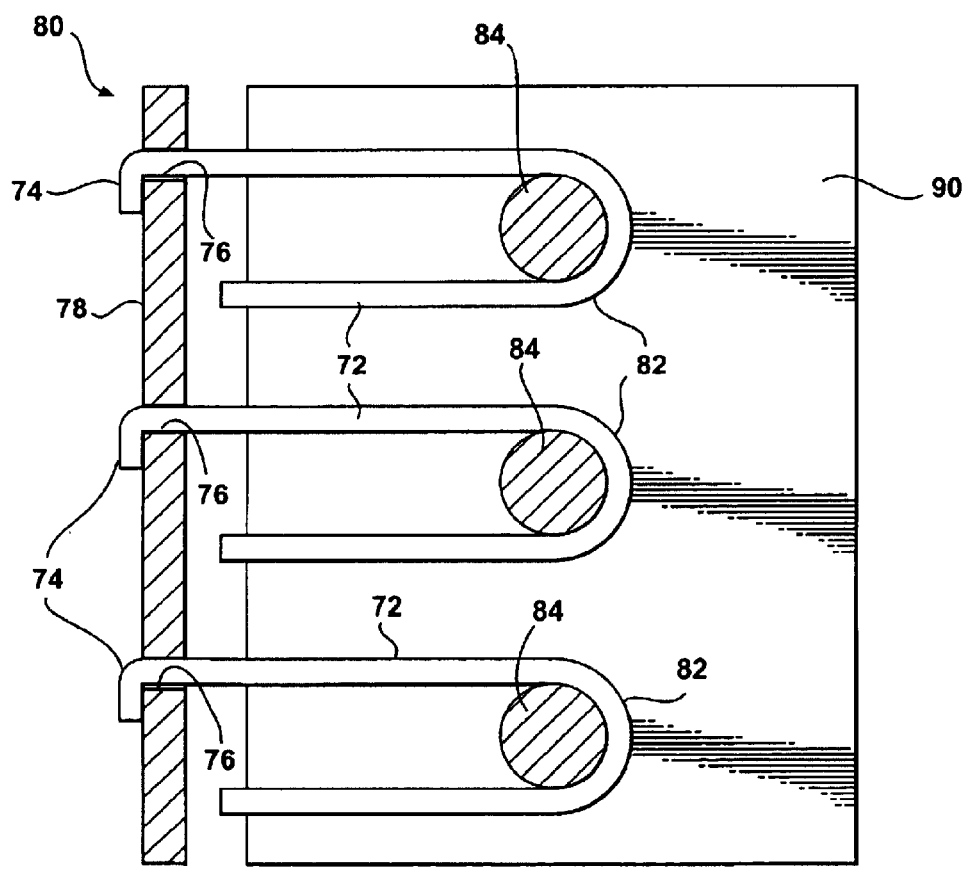
FIG. 2B is a bottom plan view of a portion of the energy absorbing device of FIG. 2A showing three plastically deformable straps.
Figure 2C:
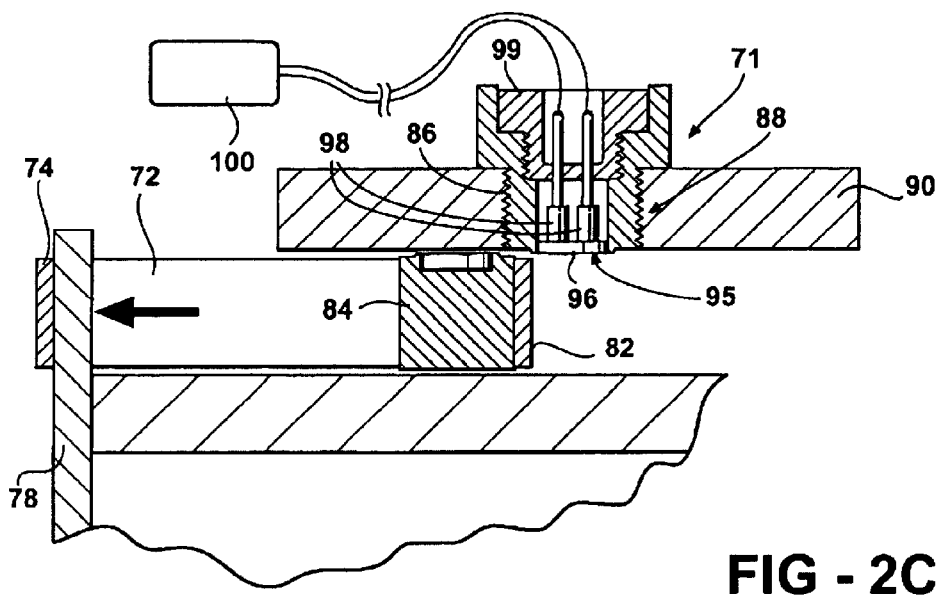
FIG. 2C is a view similar to FIG. 2A, but showing certain parts in a different position after the steering column has collapsed.
Figure 2D:
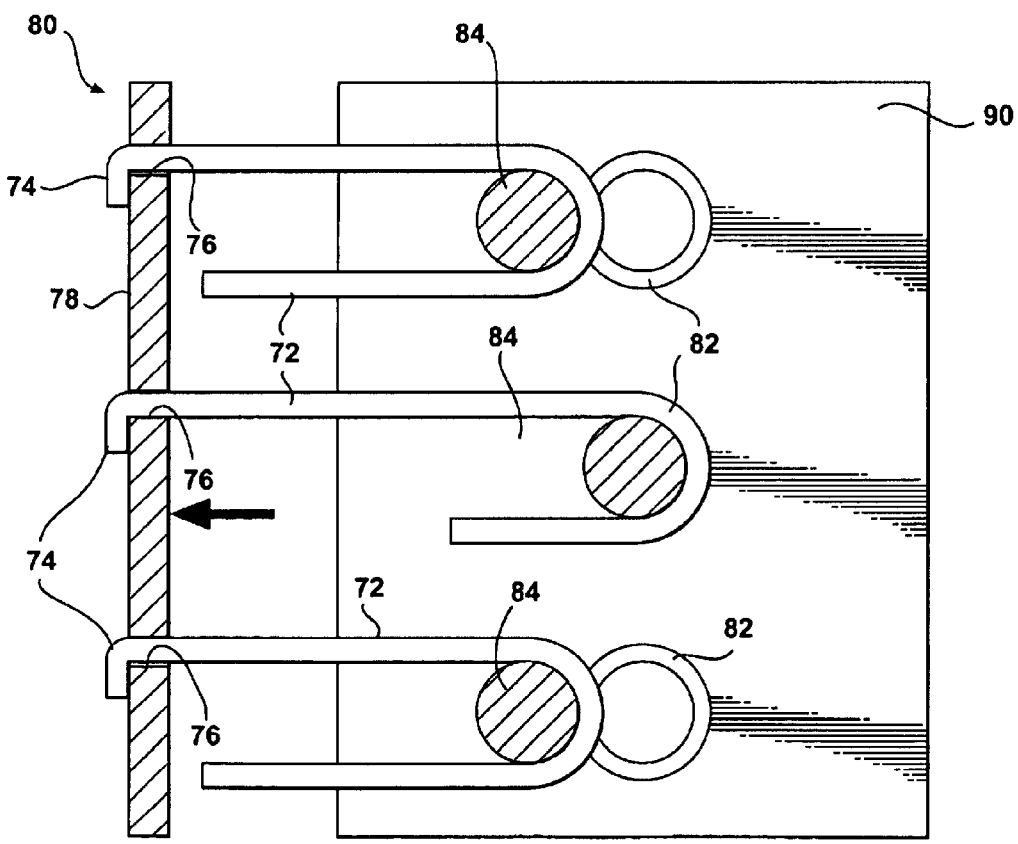
FIG. 2D is a bottom plan view of a portion of the energy absorbing device of FIGS. 2A and 2C, showing the plastically deformable straps after the steering column has collapsed.

In the event of a head-on collision in which the steering column collapses in the direction of the arrows in FIGS. 2C and 2D, a signal to the igniters 98 from a controller 100 sets off the explosive charge 96 causing the neck portion 94 of the anvil to fracture and break away. The strap 72 around the fractured anvil cannot impose any resistance to the collapse of the steering column. FIG. 2D shows only the middle strap 72 unwinding around an anvil which is still intact. The anvils for the two remaining straps have broken away so that those straps have no energy absorbing function.

Referring next to FIGS. 3A–3D, there is shown an energy absorbing device 101 having a housing 102 secured to stationary vehicle support structure 104 and including a single elongated, plastically deformable metal strap 106 having an end portion secured to a jacket portion 108 of a collapsible steering column 110 as by a rivet 112. The energy absorbing device 100 includes a cylinder 114 and a piston 116 axially reciprocable within the cylinder. The piston has piston heads 118 and 120 at opposite ends, a large diameter anvil 122 adjacent one head, a small diameter anvil 124 adjacent the other head, and an anvil 126 of intermediate diameter between the anvils 122 and 124. The strap 106 is perpendicular to the piston 116 and has an intermediate U-shaped portion 128 which extends around the piston.

Actuator assemblies 130 and 132 have bodies 133 threaded into opposite ends of the cylinder 114. An actuator 134 comprising an explosive charge 136 fills a cavity in each of the bodies 133. An igniter 138 is embedded in each explosive charge. A shear pin 140 carried by the cylinder 114 extends into a slot in the piston head 118 to initially hold the piston 116 in the position shown in FIG. 3A in which the U-shaped portion of the strap embraces the anvil 126.

When the steering column 110 collapses, the strap 106 is pulled over the anvil which it surrounds. The anvil which the strap surrounds is determined by a signal from a controller 142 to the igniter of one of the actuator assemblies 130, 132. A signal to the igniter of the actuator assembly 130 will explode the explosive charge in that actuator assembly (see FIG. 3C), breaking the shear pin 140 and moving the piston to the right so that the anvil 122 is surrounded by the strap. A signal to the igniter of the actuator assembly 132 will explode the charge in that actuator assembly, breaking the shear pin and moving the piston to the left so that the anvil 124 is surrounded by the strap. If no signal is received by either igniter, the piston 116 will remain in the position of FIG. 3A with the strap embracing the center anvil 126. The amount of resistance to steering column collapse depends on the position of the piston 116, which determines which anvil the strap bends around when it is pulled by the collapsing column.

FIG. 4A shows a piston and cylinder assembly which may be used in the energy absorbing device 100 of FIG. 3D in place of the piston and cylinder assembly shown in FIG. 3A. The assembly in FIG. 4A includes a cylinder 150 and a piston 152 axially reciprocable within the cylinder. The piston has piston heads 154 and 156 at opposite ends, a large diameter anvil 158 adjacent one head, and a small diameter anvil 160 adjacent the other head. The same strap 106 seen in FIG. 3D is employed in FIG. 4A and extends around the piston and embraces the large diameter anvil 158 in the position shown, established by a shear pin 164 which is carried by the cylinder and extends into a slot in the piston head 154. An actuator assembly 132, which is identical to the similarly numbered actuator assembly in FIG. 3A closes one end of the cylinder. The opposite end of the cylinder is closed by a cap 166 which has an air vent 168.

When the steering column collapses, the strap 106 may be pulled over the anvil 158 to absorb energy, or, in the event a signal is received from the controller 170 to the igniter in the actuator assembly 132 moving the piston to the left in FIG. 4A, the strap will be pulled around the smaller anvil 160. In the FIG. 4A embodiment, only a single actuator assembly 132 is needed to shift the piston.

Figure 4B:
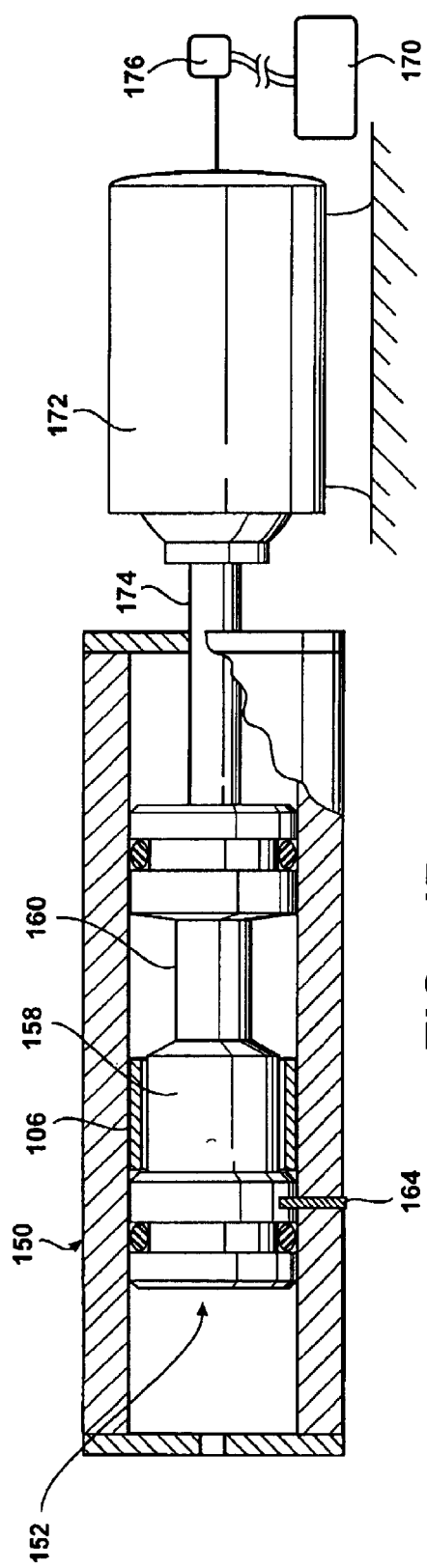
FIG. 4B is a sectional view of a portion of an energy absorbing device similar to the device of FIG. 4A but actuated by a solenoid-operated actuator rather than an explosive charge.

Referring to FIG. 4B, the same piston 152 and cylinder 150 as shown in FIG. 4A are here illustrated, but instead of an actuator assembly of the form in FIG. 4A, a solenoid actuated mechanical power unit 172 is provided. The power unit, which may be a piston and cylinder assembly, has a rod 174 connected to one end of the piston 152. The power unit is operable by an extremely fast-acting solenoid 176 when the solenoid receives a signal generated by the controller 170 in response to a collision. When operated, the power unit 172 extends the rod 174, moving the piston 152 to the left to a position in which the strap 106 surrounds the smaller diameter anvil 160.

Figure 4C:
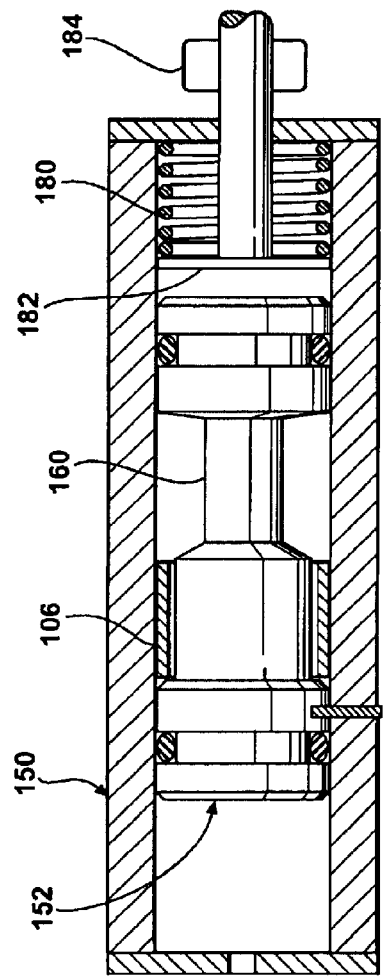
FIG. 4C is a sectional view of an energy absorbing device similar to the device of FIG. 4A but actuated by a spring.

Referring to FIG. 4C, the same piston 152 and cylinder 150 as shown in FIGS. 4A and 4B are illustrated, but instead of an actuator assembly of the form in FIG. 4A or 4B, the piston 152 is adapted to be moved leftward from the FIG. 4C position by a compression spring 180. The spring 180 is normally held under compression by a spring retainer 182 which has a stem projecting through one end of the cylinder 150 and is held by a releasable gripper 184. The gripper 184 releases under the impact of a collision, causing the pressure of the spring 180 to be applied to the piston 152 and move the piston to the left in FIG. 4C to a position in which the smaller diameter anvil 160 is surrounded by the strap 106.

Referring next to FIGS. 5A–5D, the cylinder 190 and the actuator assemblies 192 and 194 are similar to the cylinder 114 and actuator assemblies 130 and 132 shown in FIG. 3A, but the piston 198 is of a somewhat different construction. The piston 198 has a large diameter anvil 200 which is actually part of the piston head 202. The diameter of the anvil 200 approximates the inside diameter of the cylinder 190. The strap 106 occupies a recess 204 in the inner wall 205 of the cylinder 190 such that the inner surface of the strap is substantially flush with the inner wall of the cylinder and therefore does not interfere with the movement of the large diameter anvil when the piston moves upward in FIG. 5B.

Figure 5D:
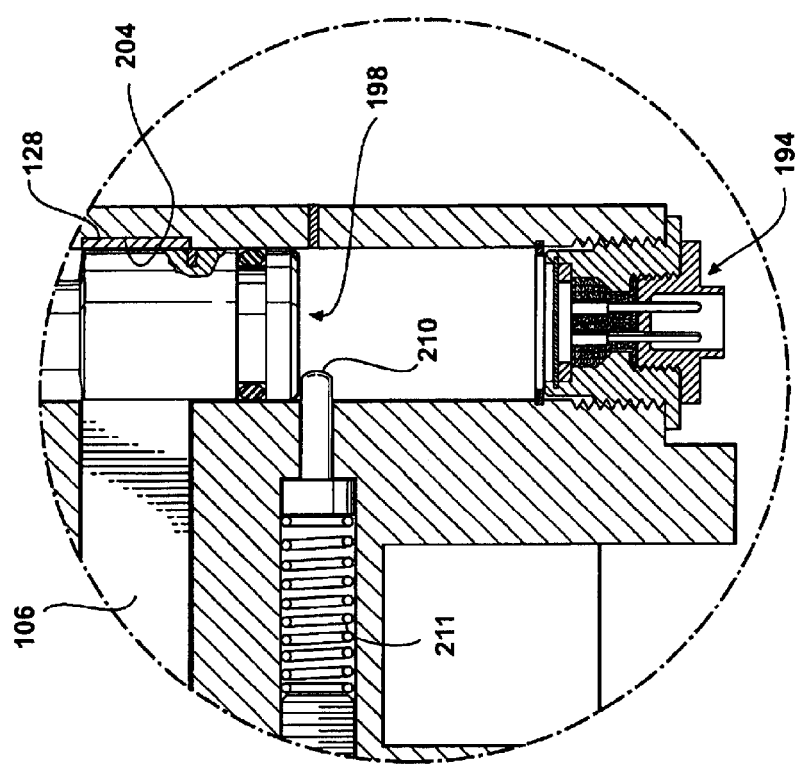
FIG. 5D is an enlarged, fragmentary sectional view of a portion of the device of FIG. 5A, but with parts in a different position.
Figure 5C:
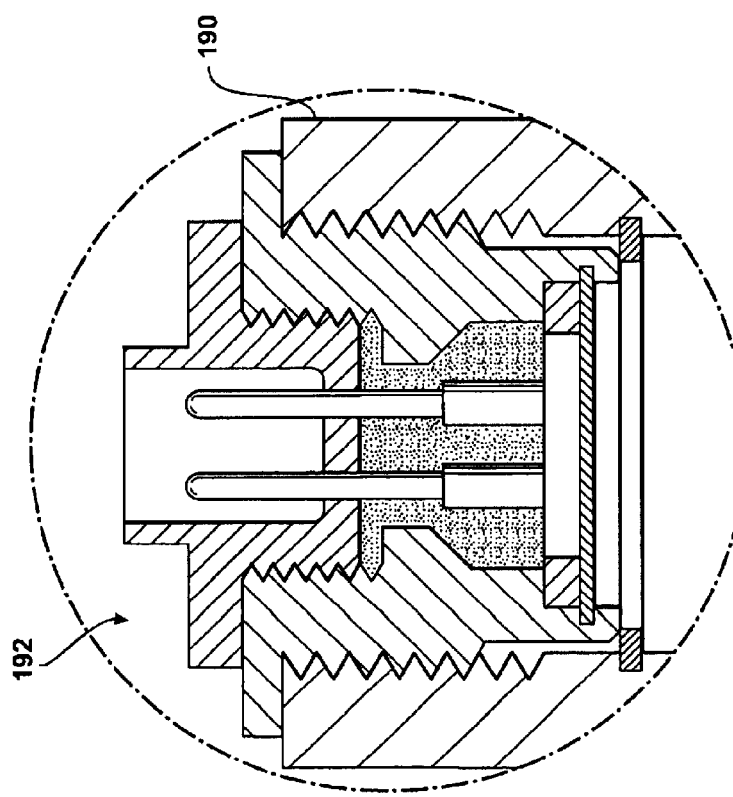
FIG. 5C is an enlarged, fragmentary sectional view of a portion of FIG. 5A.

FIG. 5A also shows a stop pin 210 under pressure of a spring 211 which normally bears against the piston head 202. When the piston 198 moves to the FIG. 5D position, the pin 210 snaps out and positively prevents reverse movement of the piston.

Figure 6:
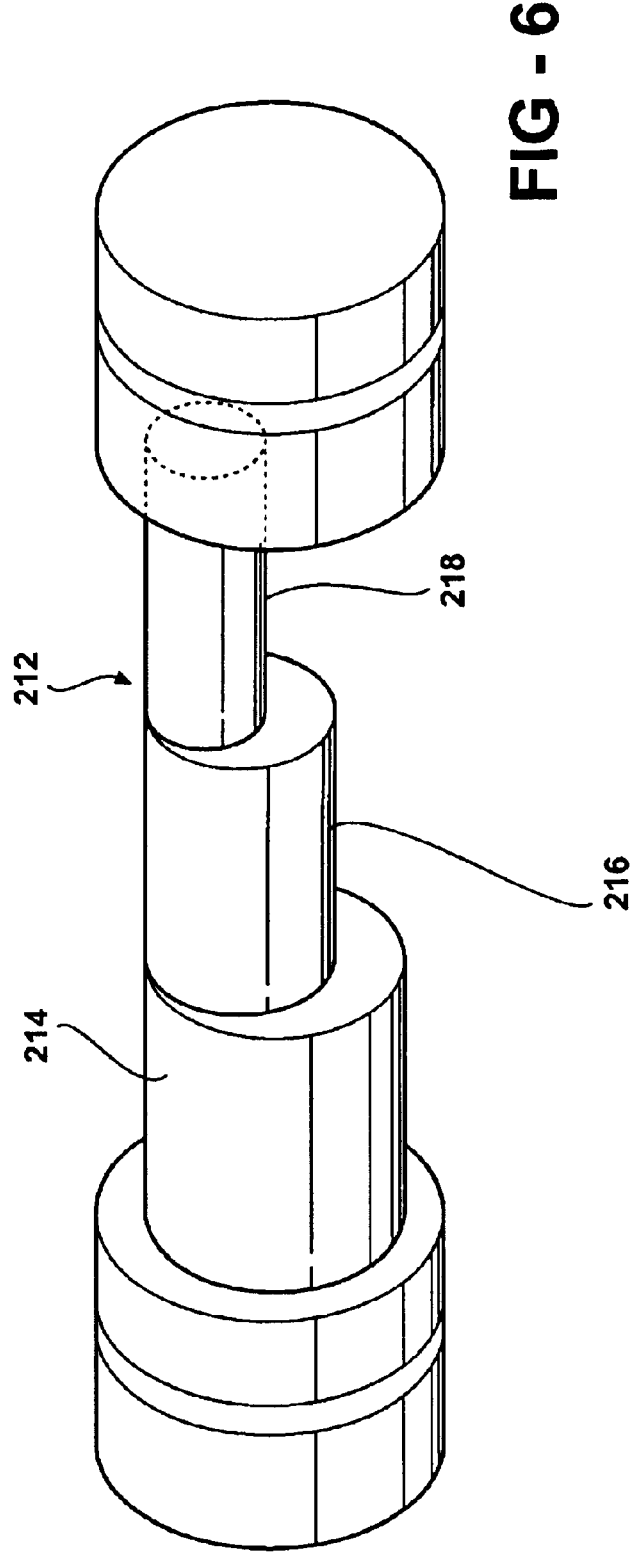
FIG. 6 is a perspective view of the piston employed in the construction of FIG. 3A.

FIG. 6B illustrates a piston 212 similar to the piston shown in FIG. 3A but in which only the large diameter anvil 214 is on the longitudinal centerline of the piston, the other two anvils 216 and 218 being laterally offset as shown. Operation of the piston 212 would be similar to the operation of the piston in FIG. 3A.

What is claimed is:

1. An energy absorbing device for a collapsible steering column of a vehicle, comprising:

a plurality of elongated, plastically deformable straps, each of said straps extending between a part of the steering column and a part of stationary vehicle support structure with one end of portion of each of said straps having a connection to one of said parts and an opposite end portion of each of said straps bent around an anvil having a connection to the other of said parts, each of said straps, together with the connections thereof and the anvil around which each of said strap is bent forming a linkage between said steering column and said vehicle support structure so that when the steering column collapses in a collision the straps will move over the anvils and resist such collapse, and a device associated with said linkage operative for breaking at least one of said linkages operated by a signal generated by a controller in response to the collision and including a knife operable when activated to bisect the strap associated with said one linkage.

2. The energy absorbing device of claim 1, wherein the device for breaking said one of the linkages includes an explosive charge for activating said knife, the signal being received by an igniter and the igniter, upon receipt of the signal, igniting the explosive charge.

3. The energy absorbing device of claim 1, wherein the device for breaking said one of the linkages includes an explosive charge for serving one of said connections associated with said one linkage, the signal being received by an igniter and the igniter, upon receipt of the signal, igniting the explosive charge.

* * * * *